US011288530B1

(12) United States Patent
Genner

(10) Patent No.: US 11,288,530 B1
(45) Date of Patent: Mar. 29, 2022

(54) SYSTEMS AND METHODS FOR LIVENESS-VERIFIED IDENTITY AUTHENTICATION

(71) Applicant: T STAMP INC., Atlanta, GA (US)

(72) Inventor: Gareth Genner, Atlanta, GA (US)

(73) Assignee: T Stamp Inc., Atlanta, GA (US)

(*) Notice: Subject to any disclaimer, the term of this patent is extended or adjusted under 35 U.S.C. 154(b) by 0 days.

(21) Appl. No.: 16/403,093

(22) Filed: May 3, 2019

Related U.S. Application Data

(60) Provisional application No. 62/667,130, filed on May 4, 2018.

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01)

(58) Field of Classification Search
CPC .......... G06F 21/30; G06F 21/32; G06F 21/35; G06F 21/45; G06F 2221/2129; G06K 9/00906; G06K 2009/00953; G06K 9/00221; G06K 9/00288; A61B 5/117; A61B 5/1176; H04L 29/06809; G06T 2207/30201; H04N 1/442; G07C 9/37; G06Q 20/388; H04W 12/06; H04T 2001/221
USPC ................................................. 382/115, 118
See application file for complete search history.

(56) References Cited

U.S. PATENT DOCUMENTS

| 8,510,797 | B2* | 8/2013 | Kasturi | G06F 21/32 |
| | | | | 726/2 |
| 8,724,856 | B1* | 5/2014 | King | G06K 9/00906 |
| | | | | 382/115 |
| 9,838,388 | B2* | 12/2017 | Mather | H04L 63/0823 |
| 10,019,561 | B1* | 7/2018 | Shelton | G06F 21/32 |
| 10,635,894 | B1* | 4/2020 | Genner | G06T 7/251 |
| 11,093,771 | B1* | 8/2021 | Genner | G06K 9/00906 |
| 11,095,631 | B1* | 8/2021 | Genner | G06K 19/06028 |
| 2013/0262873 | A1* | 10/2013 | Read | H04W 12/06 |
| | | | | 713/186 |
| 2014/0090039 | A1* | 3/2014 | Bhow | H04W 12/06 |
| | | | | 726/7 |

(Continued)

OTHER PUBLICATIONS

Updated NPL Search History from Dialog (Year: 2021).*

*Primary Examiner* — Nancy Bitar
(74) *Attorney, Agent, or Firm* — Morris, Manning & Martin, LLP; Daniel E. Sineway, Esq.; Daniel T. Begasse

(57) ABSTRACT

Systems and methods for identity authentication based on liveness-verified biometric data that cannot be stolen/spoofed. In various embodiments, the disclosed systems and methods facilitate access to SaaS platforms, transactions, and/or physical assets via identity authentication based on comparison of liveness-verified biometric data (e.g., data that has been verified as derived from the correct actual live individual to avoid bad actors spoofing the data to gain access—in one embodiment, as one factor in a two factor authentication schema) to pre-verified identity data. Liveness-verified biometric data may, in various embodiments, be derived from facial features, fingerprints, voice recognition, DNA, etc. Generally, if the liveness and identity of the requesting individual cannot be verified, then the individual will not be permitted access.

14 Claims, 3 Drawing Sheets

EXEMPLARY SYSTEM ARCHITECTURE

(56) References Cited

U.S. PATENT DOCUMENTS

| | | | |
|---|---|---|---|
| 2014/0101434 A1* | 4/2014 | Senthurpandi | G06F 21/32 |
| | | | 713/150 |
| 2014/0333415 A1* | 11/2014 | Kursun | G06Q 30/00 |
| | | | 340/5.83 |
| 2015/0154436 A1* | 6/2015 | Shi | G06F 21/32 |
| | | | 382/124 |
| 2016/0191513 A1* | 6/2016 | Tomlinson | H04L 63/0861 |
| | | | 713/168 |
| 2017/0019400 A1* | 1/2017 | Drolshagen | H04L 9/3234 |
| 2017/0134366 A1* | 5/2017 | Genner | G06Q 50/01 |
| 2017/0140141 A1* | 5/2017 | Yan | G06F 21/32 |
| 2017/0331818 A1* | 11/2017 | Kader | H04L 67/42 |
| 2018/0205557 A1* | 7/2018 | Sun | H04L 63/0853 |

\* cited by examiner

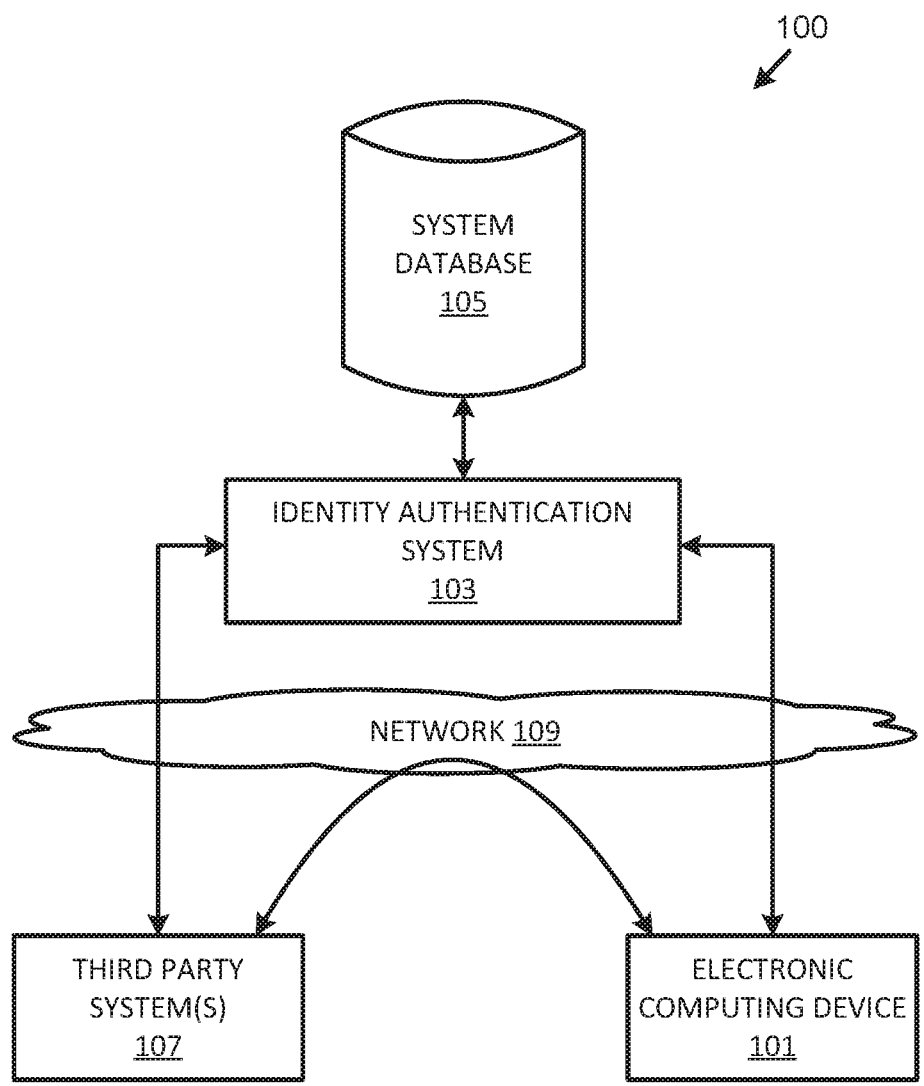
FIG 1: EXEMPLARY SYSTEM ARCHITECTURE

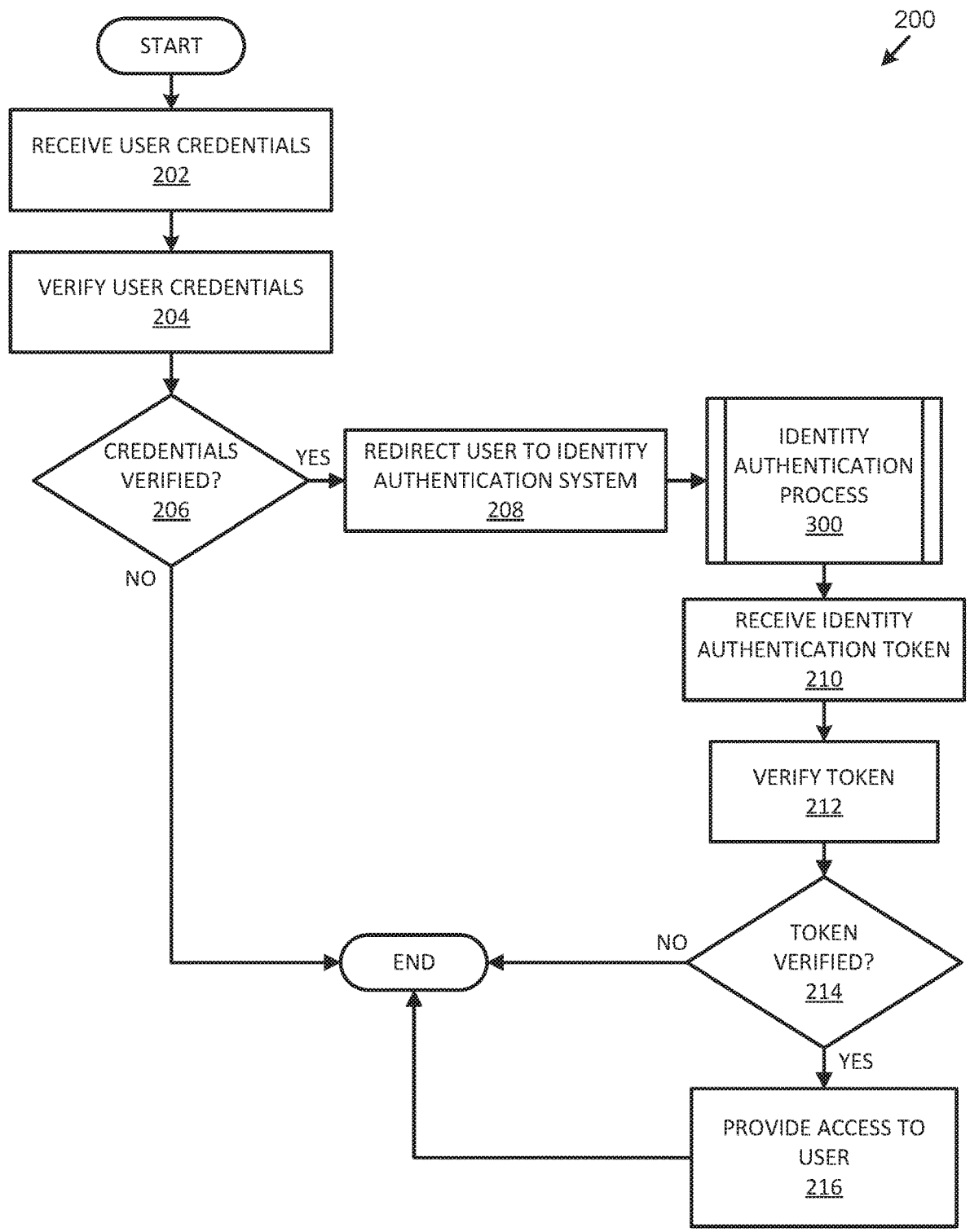
FIG 2: EXEMPLARY SYSTEM PROCESS

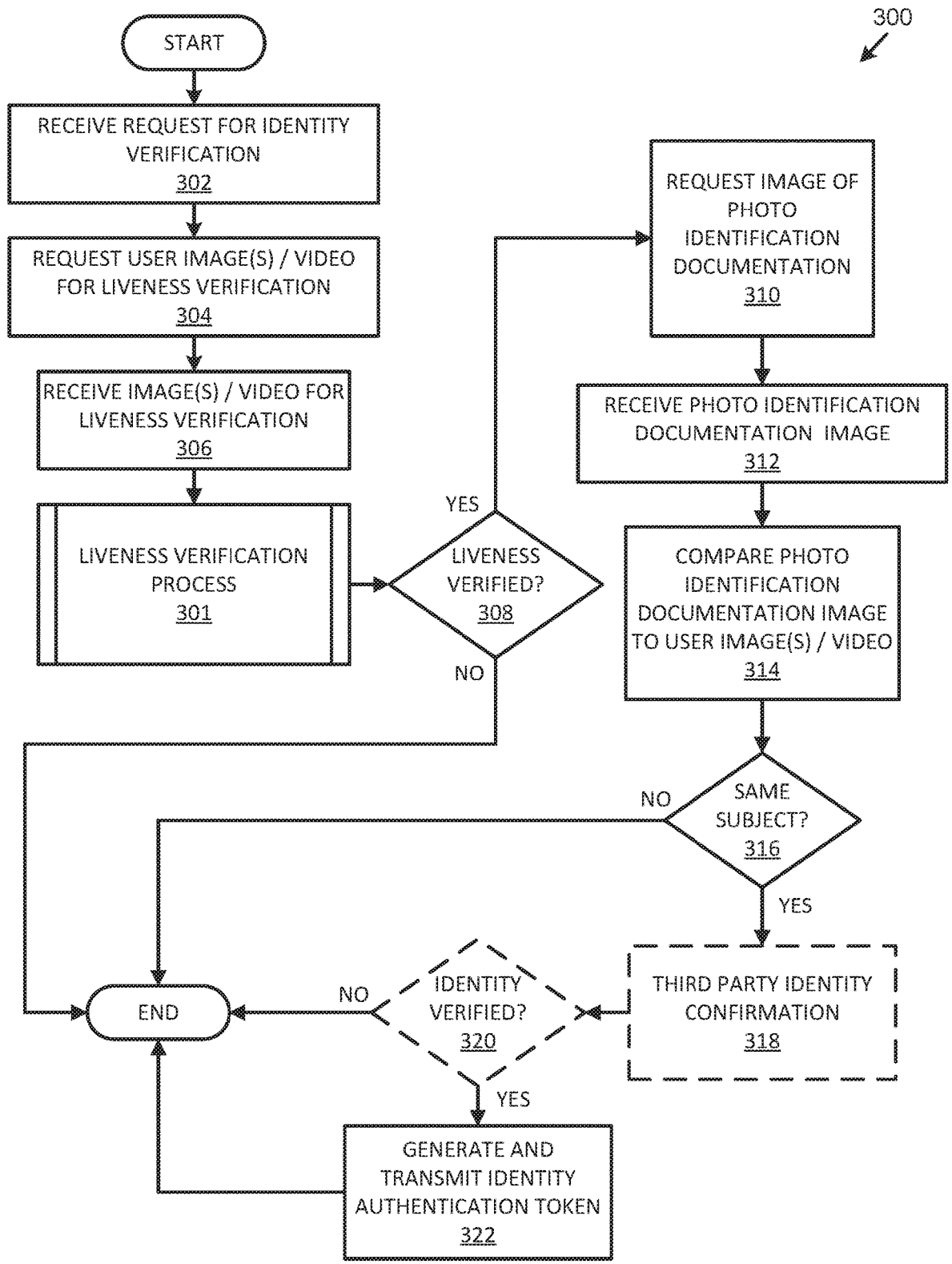
FIG 3: EXEMPLARY IDENTITY AUTHENTICATION PROCESS

SYSTEMS AND METHODS FOR LIVENESS-VERIFIED IDENTITY AUTHENTICATION

CROSS REFERENCE TO RELATED APPLICATIONS

This application claims the benefit of, and priority to, U.S. Provisional Patent Application No. 62/667,130, filed on May 4, 2018, and entitled "SYSTEMS AND METHODS FOR LIVENESS-VERIFIED IDENTITY AUTHENTICATION," the disclosure of which is incorporated by reference herein in its entirety.

TECHNICAL FIELD

The present systems and methods relate generally to identity authentication and, more particularly, to identity authentication based on liveness-verified biometric data.

BACKGROUND

Access to sensitive electronic data is increasingly becoming a large and complex risk, financially and otherwise, for individuals, corporations, and governments alike. Malicious actors desiring to access that sensitive data employ a variety of creative methods to do so—intercepting the data in motion, impersonating authorized individuals to access the data at rest, brute-force hacking into the storage location of that data at rest, etc. Once data is encrypted, its security can be assured only so long as the access procedures for the key that decrypts the data remain secure. Access procedures and credentials (e.g., passwords, secured devices, two-factor authentication, etc.), however, regardless of the level of care taken, are almost always subject to a risk of being stolen/spoofed.

Therefore, there is a long-felt but unresolved need for a system or method that permits access via identity authentication based on liveness-verified biometric data that cannot be stolen/spoofed.

BRIEF SUMMARY OF DISCLOSURE

Briefly described, and according to one embodiment, aspects of the present disclosure generally relate to systems and methods for identity authentication based on comparison of liveness-verified biometric data that cannot be stolen/spoofed to pre-verified identity data.

In various embodiments, the disclosed system facilitates access via identity authentication based on a comparison of liveness-verified biometric data (e.g., data that has been verified as derived from the correct actual live individual to avoid bad actors spoofing the data to gain access) to pre-verified identity data (e.g., data that has been previously verified as confirming the identity of the individual(s) with authorized access, such as a driver's license photo, a social media account, etc.), in one embodiment, as one factor in a two factor or multi-factor authentication schema. Liveness-verified biometric data may, in various embodiments, be derived from facial features, fingerprints, voice recognition, DNA, etc. Generally, the disclosed system improves the robustness and security of SaaS systems (e.g., email, banking, credit card, ecommerce, etc.), transactions (e.g., confirmation/preapproval of credit card transaction, wire transfers, etc., whether online or in person, including satisfying security protocols), physical assets (e.g., buildings, vehicles, facilities, etc.), offline transactions (e.g., by confirming identity prior to providing medical records, filing tax returns, receiving documents, other services, etc.), etc. by ensuring that only the proper authorized individuals are permitted access (with credentials that cannot be stolen or spoofed). In one embodiment, the system also permits the recording of the presence of an individual at a specific geographic location at a certain point in time (e.g., for billing for services later, house arrest, geo-fencing requirements, curfew, etc.).

Generally, in one embodiment, the system requests that an individual, who desires access to a system/transaction/physical asset/etc., take a photo/video of his/her face for liveness verification (e.g., determining whether the photo/video has been spoofed or is of an actual live individual). Once liveness of the photo/video is confirmed, in one embodiment, the user takes a photo of his/her photo identification document (e.g., government-issued photo identification, employer-issued photo identification, passport, driver's license, etc.) for comparison to the liveness-verified image to determine whether the individual on the photo identification document is the same person as in the liveness-verified image and whether that individual is authorized for the requested access. In one embodiment, if the liveness and identity of the individual are verified, then the individual is provided access. Generally, if the liveness and identity of the requesting individual cannot be verified, then the individual will not be permitted access. In other embodiments, other verification processes are performed (e.g., comparing information from social media accounts, verified accounts with third parties such as utilities providers, etc.). In this manner, the disclosed system improves digital account security by allowing access only to a live individual with authorized biometric features.

In various embodiments, the present disclosure discusses a method for authenticating a user's identity for accessing a protected item, the method including the steps of: receiving, at an identity authentication system, a request for verifying a user's identity from a computing device, wherein the request is received in response to the user requesting access to the protected item via the computing device; receiving liveness media from the computing device for verifying the liveness of the user, wherein the liveness media includes a picture and/or a video of the user; verifying the liveness of the user based on the received liveness media; requesting additional media associated with the user for further verifying the user's identity; receiving the additional media, wherein the additional media includes images and/or text corresponding to an identification article associated with the user; comparing the liveness media to the additional media for determining if both the liveness media and the additional media include a common subject, wherein the common subject is the user; and in response to determining that the liveness media and additional media include the common subject, generating an authentication token, wherein the authentication token allows for the user to access the protected item.

In one embodiment, the identity authentication system transmits the authentication token to the computing device for allowing the user to access the protected item. In a particular embodiment, the additional media is requested from a third party system, and wherein the third party system includes identity data corresponding to a plurality of users. In various embodiments, the identification article includes a government issued identification card.

In certain embodiments, the user takes the picture and/or video with the computing device. In at least one embodiment, the protected item includes information for accessing an external system, transaction, and/or physical asset. In some embodiments, comparing the liveness media to the additional media for determining that the liveness media and additional media include the common subject includes analyzing aspects of the media, and wherein analyzed aspects are to be substantially similar within a threshold of error. In a certain embodiment, the threshold of error includes at least an 80% match.

In various embodiments, the present disclosure discusses a system for authenticating a user's identity for accessing a protected item, the system including: a computing device, wherein the computing device is operated by a user; and an identity authentication system, wherein the identity authentication system includes at least one processor operable to: receive a request for verifying the user's identity from the computing device, wherein the request is received in response to the user requesting access to the protected item via the computing device; receive liveness media from the computing device for verifying the liveness of the user, wherein the liveness media includes a picture and/or a video of the user; verify the liveness of the user based on the received liveness media; request additional media associated with the user for further verifying the user's identity; receive the additional media, wherein the additional media includes images and/or text corresponding to an identification article associated with the user; compare the liveness media to the additional media for determining if both the liveness media and the additional media include a common subject, wherein the common subject is the user; and in response to determining that the liveness media and additional media include the common subject, generate an authentication token, wherein the authentication token allows for the user to access the protected item.

In one embodiment, the at least one processor transmits the authentication token to the computing device for allowing the user to access the protected item. In a particular embodiment, the additional media is requested from a third party system, and wherein the third party system includes identity data corresponding to a plurality of users. In a particular embodiment, the identification article includes a government issued identification card. In certain embodiments, the user takes the picture and/or video with the computing device.

In at least one embodiment, the protected item includes information for accessing an external system, transaction, and/or physical asset. In various embodiments, comparing the liveness media to the additional media for determining that the liveness media and additional media include the common subject includes analyzing aspects of the media, and wherein analyzed aspects are to be substantially similar within a threshold of error. In a particular embodiment, the threshold of error includes at least an 80% match. These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system architecture, according to one embodiment of the present disclosure.

FIG. 2 is a flowchart showing an exemplary system process, according to one embodiment of the present disclosure.

FIG. 3 is a flowchart showing an exemplary identity authentication process, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for identity authentication based on comparison of liveness-verified biometric data that cannot be stolen/spoofed to pre-verified identity data.

In various embodiments, the disclosed system facilitates access via identity authentication based on a comparison of liveness-verified biometric data (e.g., data that has been verified as derived from the correct actual live individual to avoid bad actors spoofing the data to gain access) to pre-verified identity data (e.g., data that has been previously verified as confirming the identity of the individual(s) with authorized access, such as a driver's license photo, a social media account, etc.), in one embodiment, as one factor in a two factor authentication schema. Liveness-verified biometric data may, in various embodiments, be derived from facial features, fingerprints, voice recognition, DNA, etc. Generally, the disclosed system improves the robustness and security of SaaS systems (e.g., email, banking, credit card, ecommerce, etc.), transactions (e.g., confirmation/preapproval of credit card transaction, wire transfers, etc., whether online or in person, including satisfying security protocols), physical assets (e.g., buildings, vehicles, facilities, etc.), offline transactions (e.g., by confirming identity prior to providing medical records, filing tax returns, receiving documents, other services, etc.), etc. by ensuring that only the proper authorized individuals are permitted access (with credentials that cannot be stolen or spoofed). In one embodiment, the system also permits the recording of the presence of an individual at a specific geographic location at a certain point in time (e.g., for billing for services later, house arrest, geo-fencing requirements, curfew, etc.).

Generally, in one embodiment, the system requests that an individual, who desires access to a system/transaction/physical asset/etc., take a photo/video of his/her face for liveness verification (e.g., determining whether the photo/video has been spoofed or is of an actual live individual). Once liveness of the photo/video is confirmed, in one embodiment, the user takes a photo of his/her photo identification document (e.g., government-issued photo identification, employer-issued photo identification, passport, driver's license, etc.) for comparison to the liveness-verified image to determine whether the individual on the photo identification document is the same person as in the liveness-verified image and whether that individual is authorized for the requested access. In one embodiment, if the liveness and identity of the individual are verified, then the individual is provided access. Generally, if the liveness and identity of the requesting individual cannot be verified, then the individual will not be permitted access. In other embodiments, other verification processes are performed (e.g., comparing information from social media accounts, verified accounts with third parties such as utilities providers, etc.). In this manner, the disclosed system improves digital account security by allowing access only to a live individual with authorized biometric features.

Exemplary Embodiments

Referring now to the figures, for the purposes of example and explanation of the fundamental processes and components of the disclosed systems and methods, reference is made to FIG. 1, which illustrates an exemplary architecture 100 of one embodiment of the present disclosure. As will be understood and appreciated, the exemplary architecture 100 shown in FIG. 1 represents merely one approach or embodiment of the present system, and other aspects are used according to various embodiments of the present system. Generally, the disclosed system 100 facilitates identity authentication via comparison of liveness-verified biometric data to pre-verified identity data. Liveness-verified biometric data may, in various embodiments, be derived from facial features, fingerprints, voice recognition, DNA, or any other individual-specific/unique biometric data. Pre-verified identity data may, in various embodiments, be derived from government-issued identification documents, employer-issued identification documents, social media accounts, etc.

In various embodiments, the disclosed system 100 includes an electronic computing device 101 operatively connected to an identity authentication system 103 (including a system database 105) and one or more third party systems 107 via a network 109 for identity authentication based on liveness-verified biometric data that cannot be stolen/spoofed.

For example, in one practical application and non-limiting embodiment, an individual wants to access his/her email account using his/her cell phone 101. Generally, the individual provides his/her user name and password for the email account. If verified, in one embodiment, the phone 101 then requests that that the individual take a photo/video of his/her face for identity verification (e.g., determining whether the correct individual is accessing the email account). To verify the identity of the individual, the system 103 first determines, in one embodiment, whether the photo/video has been spoofed or is of a live individual. In various embodiments, the system may determine if a photo/video has been spoofed via techniques described in U.S. patent application Ser. No. 15/782,940, entitled "Systems and Methods for Passive-Subject Liveness Verification in Digital Media," filed on Oct. 13, 2017, the entire disclosure of which is herein incorporated by reference. Once liveness of the photo/video is confirmed, in one embodiment, the phone 101 requests that the individual take a photo/video of a photo identification document (e.g., driver's license, passport, credit card with photo, etc.). Generally, the system 103 compares the name on the photo identification document to the name(s) associated with the email account and compares the individual in the received, liveness-verified photo to the individual in the photo on the photo identification document. In various embodiments, if the names and photos match, then the identity of the individual is verified, and the individual is given access to his/her email account. Generally, if the names and/or photos do not match, then the individual will not be permitted to access the email account, the attempt will be logged, etc. In this manner, the disclosed system 103 improves digital account security by allowing only a live individual with authorized biometric features to access an account. Accordingly, the sensitivity of the name/photo match may be adjusted based on the desired security for a particular account (e.g., requiring closer to 100% likelihood of a match for more security, accepting less than 100% likelihood of a match for less security, etc.). Similarly, the system 103 may interface with one or more third party systems 107 (e.g., Facebook®, state department of motor vehicles database, cellular carrier, etc.) to perform additional comparisons to determine the individual's identity.

The system generally places no limitations on the types of accounts that may be accessed (e.g., email, credit card, mobile phone, etc.). Further, the system places no limitations on the types of photo identification documents that may be used (e.g., driver's license, passport, credit card with photo, school id, etc.).

Generally, the electronic computing device 101 is any device that is capable of performing the functionality disclosed herein (e.g., desktop computer, laptop computer, tablet computer, smartphone, smartwatch, camera, video camera, image capture device, etc.). In various embodiments, the electronic computing device 101 communicates via network 109 with the identity authentication system 103 and the third party system(s) 107 as part of the system process 200. In one embodiment, the electronic computing device 101 is the device through which the user accesses his/her account and via which the images are taken for identity authentication. In one embodiment, the electronic computing device 101 has a camera or other image capture device and takes the image in real time with the request for identity authentication.

Generally, the identity authentication system 103 may be any computing device (e.g., desktop computer, laptop, servers, tablets, etc.), combination of computing devices, software, hardware, or combination of software and hardware that is capable of performing the functionality disclosed herein. In various embodiments, the identity authentication system 103 is operatively connected to the electronic computing device 101 and third party systems 107 via the network 109 to conduct the processes/analyses disclosed herein. In one embodiment, the identity authentication system 103 further includes the system database 105. Generally, the system database 105 may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the system database 105 is local to the identity authentication system 103 (e.g., the identity authentication system 103 includes the system database 105, etc.). In other embodiments, the system database 105 is virtual or stored in the "cloud." In one embodiment, the system database 105 includes data for identity authentication (e.g., names associated with accounts, photographs of individuals associated with accounts, etc.).

Generally, the third party system 107 may be any computing device (e.g., desktop computer, laptop, servers, tablets, etc.), combination of computing devices, software, hardware, or combination of software and hardware that is capable of performing the functionality disclosed herein. In various embodiments, the third party system 107 communicates via network 109 with the electronic computing device 101 and the identity authentication system 103 as part of the system process 200. In one embodiment, the third party system 107 is the system that the user is attempting to access via the electronic computing device 101. In one embodiment, the third party system 107 provides additional data to further confirm the identity of the user of the electronic computing device 101.

Generally, the network 109 may be any connection capable of transferring data between two or more computer systems (e.g., a secure or unsecured connection, Bluetooth, wireless or wired local-area networks (LANs), cell network, the Internet, etc.).

FIG. 2 is a flowchart showing an exemplary system process 200, according to one embodiment of the present disclosure. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. Generally, the exemplary system process 200 is the process by which a user accesses an account, data, or some other secured functionality using the disclosed system. In various embodiments, the identity authentication-based comparison of liveness-verified biometric data to pre-verified identity data can be thought of as a factor in a two factor or multi-factor authentication schema, wherein access to the account is only permitted if the identity authentication is satisfied.

In various embodiments, the exemplary system process 200 begins at step 202, wherein the third party system 107 (e.g., SaaS software platform, email system, banking system, etc.) receives the user credentials of the user (e.g., user name and password, etc.) as part of the user's attempt to log into the third party system using the electronic computing device 101. At step 204, the third party system verifies the user credentials to determine if they are valid. In various embodiments, verifying the user credentials may include comparing the user credentials to stored credentials (where the user has already established an account/profile with valid credentials), cross referencing the user credentials with credentials at another system (e.g., verifying credentials/log-in information with a social media platform), tokenizing the user credentials and comparing the tokenized credentials to a stored token corresponding to verified credentials, etc. Generally, at step 206, the system determines whether the credentials were verified. If the credentials were not verified, then, after step 206 in one embodiment, a rejection message is sent to the device, the third party system 107 logs the rejection, the third party system 107 otherwise denies access to the device, or the third party system 107 takes another action, and the exemplary system process 200 ends thereafter. If, however, the credentials are verified, then, at step 208, in one embodiment, the user is redirected to the identity authentication system 103 for completion of the identity authentication process 300 (further details of which will be discussed in association with the description of FIG. 3). Generally, at step 208, the user may be completely redirected from the third party system 107 to the identity authentication system 103 to complete the identity authentication process 300 or the steps of the identity authentication process 300 may be embedded into the third party system (e.g., via application programming interface or "API," manually, orally, text message, barcode, QR code, etc.) so that the user is unaware that he/she is interacting with the identity authentication system.

After completion of the identity authentication process 300, in one embodiment, the third party system 107 receives an identity authentication token at step 210 that serves to verify that the identity authentication system 103 was able to verify the user's identity. Thus, in various embodiments and at step 212, the third party system 107 verifies the validity of the token (e.g., determining that it meets the expected format, contains the appropriate information, has a valid date/time stamp, etc.).

Generally, at step 214, the system determines whether the token was verified. If the token was verified, then, in one embodiment, the user is provided access to the third party system at step 216 and the exemplary system process 200 ends thereafter. If the token was not verified, then, after step 214 in one embodiment, a rejection message is sent to the device, the third party system logs the rejection, the third party system otherwise denies access to the device, or the third party system takes another action, and the exemplary system process 200 ends thereafter.

FIG. 3 is a flowchart showing an exemplary identity authentication process 300, according to one embodiment of the present disclosure. Generally, the exemplary identity authentication process 300 is the process by which the identity of the user is confirmed using a liveness-verified image of the user and an image of the user's photo identification document.

In various embodiments, the exemplary identity authentication process 300 begins at step 302, wherein the identity authentication system 103 receives a request for identity verification from a third party system 107 (e.g., email system, banking system, SaaS platform, etc.). Thus, at step 304 the system requests an image/video for liveness verification of the user. The user requesting access will take the requested image/video (e.g., using electronic computing device 101 to take a photo/video of the user's face, moving the electronic computing device 101 as instructed to change the perspective of the photo/video, performing any other acts as instructed, etc.), wherein the system receives it at step 306. Generally, the system conducts a liveness verification process 301 on the received image/video to determine whether it is of a live individual (e.g., hasn't been spoofed) using various algorithms (e.g., machine learning algorithms, etc.). Further details of the exemplary liveness verification process 301 are discussed in U.S. patent application Ser. No. 15/782,940, entitled "Systems and Methods for Passive-Subject Liveness Verification in Digital Media," filed Oct. 13, 2017, the entire disclosure of which is herein incorporated by reference.

After the liveness verification process 301, the system determines, at step 308, whether the received image/video is of a live individual. If liveness is not verified, then, in various embodiments, a rejection message is sent to the device, the system logs the rejection, the system otherwise denies access to the device, or the system takes another action, and the exemplary identity authentication process 300 ends thereafter. If, however, liveness is verified, then the system proceeds, at step 310, to request an image of a photo identification document (e.g., driver's license, etc.) to confirm the identity of the individual in the image received at step 306. The user requesting access will take the requested image/video (e.g., using electronic computing device 101 to take a photo/video of the user's photo identification document, moving the electronic computing device 101 as instructed to change the perspective of the photo/video, performing any other acts as instructed, etc.), wherein the system receives it at step 312.

In various embodiments, at step 314, the system compares the image received at step 312 with the image received at step 306 to confirm that the images substantially match and that the user is authorized to access the account he/she is attempting to access. For example, the system will compare the image of the individual on the photo identification document (received at step 314) to the individual in the photo received at step 306 using one or more matching algorithms (e.g., machine-learning algorithms, face matching algorithms, etc.). If the individuals match within a predetermined tolerance (e.g., 50% likelihood, 60%, 70%, 80%, 90%, 95%, 99%, 100%, etc.), then, in one embodiment, the system will extract the name from the photo identification document (e.g., using machine-learning algorithms, optical character recognition, etc.) and compare the extracted name to a list of name associated with individuals authorized to access the account for which access has been requested. Further, in one embodiment, the system may also compare other attributes of the photo identification document (e.g., watermarks, holograms, color, other security features, etc.) to determine whether the photo identification document is genuine (e.g., based on characteristics and/or templates of photo identification documents stored in the system database 105, etc.). Thus, at step 316, the system determines whether the user is authorized to access the account he/she is attempting to access (based on the comparison from step 314). If the user is not authorized, then, in various embodiments, a rejection message is sent to the device, the system logs the rejection, the system otherwise denies access to the device, or the system takes another action, and the exemplary identity authentication process 300 ends thereafter.

If, however, the user is authorized, then, in one embodiment, at optional step 318, the system attempts to further confirm the user's identity using data from another third party system 107 (typically not the third party system that the user is attempting to access, but another third party system with additional information regarding the user's identity). For example, the system may pull additional images from social media accounts that have been pre-verified as belonging to the individuals authorized to access the account the user is attempting to access and compare those images to the images received at steps 306 and/or 312. Similarly, the system may extract data from the electronic computing device 101 or an internet provider/cellular carrier associated with the same, such as IP address, geographic location, account owner, etc., to determine whether that data is within expected parameters.

At optional step 320, the system determines whether the user's identity was further verified at optional step 318. If the user's identity was not verified, then, in various embodiments, a rejection message is sent to the device, the system logs the rejection, the system otherwise denies access to the device, or the system takes another action, and the exemplary identity authentication process 300 ends thereafter. If however, the user's identity was verified, then, in various embodiments, the system generates an identity authentication token that confirms the correct user is attempting to access the account and transmits it to the third party system 107 at step 322. In various embodiments, the token may be sent to the third party system by API, text message, email, or other communication method (e.g., barcode, QR code, given to the user for manual entry, etc.). In one embodiment, instead of generating a token, the system provides other confirmation to the third party system so that the user may gain access to the same. In one embodiment, the token or other confirmation is encrypted prior to transmission to the third party system 107. After transmitting the identity authentication token at step 322, the exemplary identity authentication process 300 ends thereafter.

In one embodiment, the system may employ a blockchain implementation in which an encrypted copy of an enrollment biometric hash is stored by a decentralized application ("DApp") on a blockchain. In this scenario, prior to authorizing a transaction, the DApp application may compare the biometric hash (generated from a secure image of the user, or "selfie") to the stored hash, and furthermore generate an authentication token if appropriate. The entire process may operate on the blockchain through the DApp, or the DApp may be a secondary authentication for a server-based application. In various embodiments, the DApp may also be a backup processing system in the event of a denial of service attack upon a server-based system, or another system failure.

According to various aspects of the present disclosure, the system may employ other distributed ledgers, such as a Quorum blockchain, quantum ledger database ("QLDB"), or the like. In various embodiments, employing distributed ledgers may allow for hashes to be created on electronic computing devices (e.g., tablets, smart phones, etc.), and the electronic computing devices may synchronize with other devices via Bluetooth, NFC, wireless LAN, etc., so that the devices form a mesh network, or the like, and the devices may then periodically synchronize with the ledger. In particular embodiments, the hashes created on the electronic computing devices may be synchronized with the distributed ledger, a server, a blockchain-based data lake, etc., when each electronic computing device establishes an internet connection. In certain embodiments, this periodic synchronization allows for the electronic computing devices to operate in "off-line" environments, when an internet connection is not readily available.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method for authenticating a user's identity for accessing a protected item, the method comprising the steps of:

receiving, at an identity authentication system, a request for verifying a user's identity from a computing device, wherein the request is received in response to the user requesting access to the protected item via the computing device;

receiving liveness media from the computing device for verifying the liveness of the user, wherein the liveness media comprises a picture and/or a video of the user;

verifying the liveness of the user based on the received liveness media;

requesting additional media associated with the user for further verifying the user's identity and authenticating the requested access to the protected item, wherein the additional media is requested from a pre-verified personal account purported to belong to the user at a particular third party system of a plurality of third party systems, wherein each third party system comprises identity data uploaded by a plurality of users to their respective user accounts at each respective third party system, wherein the user maintains a personal account with each of the plurality of third party systems, and wherein the identity authentication system recognizes the additional media stored at the pre-verified personal account as belonging to the user with pre-verified authorization to access the protected item;

receiving the additional media, wherein the additional media comprises images and/or text corresponding to an identification article associated with the user;

comparing the liveness media to the additional media for determining if both the liveness media and the additional media comprise a common subject, wherein the common subject is the user; and in response to determining that the liveness media and additional media comprise the common subject, generating an authentication token, wherein the authentication token allows for the user to access the protected item.

2. The method of claim 1, wherein the identity authentication system transmits the authentication token to the computing device for allowing the user to access the protected item.

3. The method of claim 1, wherein the identification article comprises a government issued identification card.

4. The method of claim 1, wherein the user takes the picture and/or video with the computing device.

5. The method of claim 1, wherein the protected item comprises information for accessing an external system, transaction, and/or physical asset.

6. The method of claim 1, wherein comparing the liveness media to the additional media for determining that the liveness media and additional media comprise the common subject comprises analyzing aspects of the media, and wherein analyzed aspects are to match within a threshold of error.

7. The method of claim 6, wherein the threshold of error comprises at least an 80% match.

8. A system for authenticating a user's identity for accessing a protected item, the system comprising:

a computing device, wherein the computing device is operated by a user; and an identity authentication system, wherein the identity authentication system comprises at least one processor operable to:

receive a request for verifying the user's identity from the computing device, wherein the request is received in response to the user requesting access to the protected item via the computing device;

receive liveness media from the computing device for verifying the liveness of the user, wherein the liveness media comprises a picture and/or a video of the user;

verify the liveness of the user based on the received liveness media;

request additional media associated with the user for further verifying the user's identity and authenticating the requested access to the protected item, wherein the additional media is requested from a pre-verified personal account purported to belong to the user at a particular third party system of a plurality of third party systems, wherein each third party system comprises identity data uploaded by a plurality of users to their respective user accounts at each respective third party system, wherein the user maintains a personal account with each of the plurality of third party systems, and wherein the identity authentication system recognizes the additional media stored at the pre-verified personal account as belonging to the user with pre-verified authorization to access the protected item;

receive the additional media, wherein the additional media comprises images and/or text corresponding to an identification article associated with the user;

compare the liveness media to the additional media for determining if both the liveness media and the additional media comprise a common subject, wherein the common subject is the user; and in response to determining that the liveness media and additional media comprise the common subject, generate an authentication token, wherein the authentication token allows for the user to access the protected item.

9. The system of claim 8, wherein the at least one processor transmits the authentication token to the computing device for allowing the user to access the protected item.

10. The system of claim 9, wherein the identification article comprises a government issued identification card.

11. The system of claim 8, wherein the user takes the picture and/or video with the computing device.

12. The system of claim 8, wherein the protected item comprises information for accessing an external system, transaction, and/or physical asset.

13. The system of claim 8, wherein comparing the liveness media to the additional media for determining that the liveness media and additional media comprise the common subject comprises analyzing aspects of the media, and wherein analyzed aspects are to match within a threshold of error.

14. The system of claim 13, wherein the threshold of error comprises at least an 80% match.

* * * * *